(12) United States Patent
Xing et al.

(10) Patent No.: US 10,084,335 B2
(45) Date of Patent: Sep. 25, 2018

(54) WIRELESS CHARGING DEVICE AND WEARABLE DEVICE

(71) Applicant: Wuhan China Star Optoelectronics Technology Co., Ltd., Wuhan, Hubei (CN)

(72) Inventors: Zhenzhou Xing, Guangdong (CN); Chun-hung Huang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 320 days.

(21) Appl. No.: 14/916,998

(22) PCT Filed: Jan. 14, 2016

(86) PCT No.: PCT/CN2016/070918
§ 371 (c)(1),
(2) Date: Mar. 5, 2016

(87) PCT Pub. No.: WO2017/113446
PCT Pub. Date: Jul. 6, 2017

(65) Prior Publication Data
US 2018/0048176 A1     Feb. 15, 2018

(30) Foreign Application Priority Data

Dec. 28, 2015    (CN) .......................... 2015 1 1004850

(51) Int. Cl.
*H02J 7/00*      (2006.01)
*H02J 50/10*      (2016.01)
(Continued)

(52) U.S. Cl.
CPC .............. *H02J 7/025* (2013.01); *H02J 50/10* (2016.02); *H04B 5/0037* (2013.01)

(58) Field of Classification Search
CPC .......... H02J 7/025; H02J 50/10; H04B 5/0037
(Continued)

(56) References Cited

U.S. PATENT DOCUMENTS 5,821,728 A * 10/1998 Schwind ............... B60L 11/182
320/108
9,614,371 B1 * 4/2017 Farkas ....................... H02J 3/14
(Continued)

FOREIGN PATENT DOCUMENTS

| CN | 102136763 A | 7/2011 |
| CN | 102871663 A | 1/2013 |

(Continued)

OTHER PUBLICATIONS

Zhuang, Chinese Patent Document No. CN 204721011, published Oct. 21, 2015, 2 pages, abstract and drawing.*

*Primary Examiner* — Phallaka Kik
(74) *Attorney, Agent, or Firm* — Andrew C. Cheng

(57) ABSTRACT

The present invention discloses a wireless charging device, comprising a power generation module, a power storage module, a wireless charging emitting module and a wireless charging receiving module, and the power generation module can generate current in a motion state, and the power storage module comprises an electrical energy transmission unit and an automatic power storage unit electrically coupled to the electrical energy transmission unit, and the automatic power storage unit is employed to store the current generated by the power generation module, and the electrical energy transmission unit is employed to provide electrical energy to the wireless charging emitting module, and the wireless charging emitting module transmits the electrical energy to the wireless charging receiving module.

(Continued)

The wireless charging device can charge the apparatus to be charged anytime and extend the battery life of the apparatus to be charged.

16 Claims, 3 Drawing Sheets

(51) Int. Cl.
  *H04B 5/00* (2006.01)
  *H02J 7/02* (2016.01)
(58) Field of Classification Search
  USPC .............................. 320/108, 112, 114, 138
  See application file for complete search history.

(56) References Cited

U.S. PATENT DOCUMENTS

| | | | | |
|---|---|---|---|---|
| 9,780,633 | B2* | 10/2017 | Shastry | H02K 35/02 |
| 9,888,337 | B1* | 2/2018 | Zalewski | H04W 4/70 |
| 9,888,351 | B2* | 2/2018 | Olson | H04W 4/023 |
| 9,971,015 | B2* | 5/2018 | Zeine | H04W 4/30 |
| 2003/0030342 | A1* | 2/2003 | Chen | H02J 50/90 |
| | | | | 310/102 R |
| 2005/0156563 | A1* | 7/2005 | Lin | F21L 13/00 |
| | | | | 320/108 |
| 2012/0095531 | A1* | 4/2012 | Derbas | A61N 1/0553 |
| | | | | 607/68 |
| 2012/0306438 | A1* | 12/2012 | Howard | A42B 3/046 |
| | | | | 320/107 |
| 2014/0097758 | A1* | 4/2014 | Recker | H05B 37/0272 |
| | | | | 315/152 |
| 2014/0275874 | A1* | 9/2014 | Haisley | H02J 7/0042 |
| | | | | 600/323 |
| 2014/0312834 | A1* | 10/2014 | Tanabe | H02J 7/025 |
| | | | | 320/108 |
| 2015/0214823 | A1* | 7/2015 | Shastry | H02K 7/1876 |
| | | | | 320/107 |
| 2016/0020682 | A1* | 1/2016 | Shastry | H02K 35/02 |
| | | | | 310/30 |
| 2016/0105854 | A1* | 4/2016 | Lee | H04W 52/367 |
| | | | | 455/127.2 |
| 2016/0291550 | A1* | 10/2016 | Chen | H02J 50/10 |
| 2016/0299210 | A1* | 10/2016 | Zeine | G01S 5/0294 |
| 2016/0300547 | A1* | 10/2016 | El-Rukby | G09G 5/003 |
| 2017/0025857 | A1* | 1/2017 | Matthews | H02J 50/40 |
| 2017/0105096 | A1* | 4/2017 | Olson | H04B 17/318 |
| 2018/0026513 | A1* | 1/2018 | Shastry | H02K 7/1876 |

FOREIGN PATENT DOCUMENTS

| | | |
|---|---|---|
| CN | 103532182 A | 1/2014 |
| CN | 103699000 A | 4/2014 |
| CN | 103859688 A | 6/2014 |
| CN | 104113119 A | 10/2014 |
| CN | 104953691 A | 9/2015 |
| JP | 2010283982 A | 12/2010 |

* cited by examiner

US 10,084,335 B2

WIRELESS CHARGING DEVICE AND WEARABLE DEVICE

CROSS REFERENCE

This application claims the priority of Chinese Patent Application No. 201511004850.X, entitled "Wireless charging device and wearable device", filed on Dec. 28, 2015, the disclosure of which is incorporated herein by reference in its entirety.

FIELD OF THE INVENTION

The present invention relates to a charging device field, and more particularly relates to a wireless charging device and a wearable device including the wireless charging device.

BACKGROUND OF THE INVENTION

With the development of the electronic technology, the portable devices have already become an important part of the life and the work. Most batteries of the portable device, and more particularly the smart wearable device are non removable batteries, and require a charging cable for charging. When one charge is accomplished, the electrical energy of the battery can satisfy a certain working period of the portable device. However, the usage period of one charge is so limited, and the battery life of the portable device is short. The user needs to connect the charger for the repeated charging, and the charger has to be hand carried. What is more inconvenient is that in an outdoor trip, business trip or other outdoor activities after the electrical amount of the portable device is ran out, it is difficult to find the power source for charging. Even the charger is in site but still cannot provide the electrical energy for the portable device, which is extremely inconvenient.

SUMMARY OF THE INVENTION

An objective of the present invention is to provide a wireless charging device, and the wireless charging device can charge the apparatus to be charged anytime and extend the battery life of the apparatus to be charged.

The present invention further provides a wearable device comprising the wireless charging device.

For solving the aforesaid technical issue, the technical solution employed by the present invention is:

First, the present invention provides a wireless charging device, wherein the wireless charging device comprises a power generation module, a power storage module, a wireless charging emitting module and a wireless charging receiving module, and the power generation module can generate current in a motion state, and the power storage module comprises an electrical energy transmission unit and an automatic power storage unit electrically coupled to the electrical energy transmission unit, and the automatic power storage unit is employed to store the current generated by the power generation module, and the electrical energy transmission unit is employed to provide electrical energy to the wireless charging emitting module, and the wireless charging emitting module transmits the electrical energy to the wireless charging receiving module for charging the apparatus to be charged which the wireless charging receiving module is equipped.

The power generation module comprises a magnetic field generation unit and a cutting unit, and in a process of a motion of the wireless charging device, the cutting unit cuts the magnetic induction line generated by the magnetic field generation unit to generate the current, and the current is imported to the automatic power storage unit.

The cutting unit is a metal line electrically coupled to the automatic power storage unit.

The magnetic field generation unit comprises a first electrode plate, a second electrode plate which are oppositely located and the magnetic induction lines between the first electrode plate and the second electrode plate, and the cutting unit is located on the first electrode plate or between the first electrode plate and the second electrode plate, and the cutting unit comprises at least one cutting guide plate, and an inner fixing part and an outer fixing part which are electrically coupled to the cutting guide plate, and the cutting guide plate comprises a fixed end and a free end, and the fixed end is rotatably fixed at the inner fixing part, and the free end rotatably contacts with the outer fixing part, and the cutting guide plate can rotate around the inner fixing part, and the automatic power storage unit comprises a first electrode and a second electrode, and the inner fixing part is electrically coupled to the first electrode, and the outer fixing part is electrically coupled to the second electrode.

The fixed end of the cutting guide plate appears to be a circular ring, and the inner fixing part appears to be a cylinder, and the fixed end is sleeved with the inner fixing part.

The power generation module comprises many of the cutting units, and all the inner fixing parts of the cutting units are electrically coupled to the first electrode, and all the outer fixing parts are electrically coupled to the second electrode.

A cutting plane of the cutting guide plate and the magnetic induction line forms an included angle which is larger than 0° and smaller or equal to 90°.

The wireless charging emitting module comprises an oscillating circuit, an amplifying circuit and a step up circuit coupled to the oscillating circuit, and an emitting electrode coupled to the step up circuit, and the wireless charging receiving module comprises a receiving electrode, and a step down circuit coupled to the receiving electrode and a rectification circuit coupled to the step down circuit, and the electrical energy transmission unit inputs a direct current into the wireless charging emitting module, and the direct current is converted into an alternating current by the oscillating circuit, and the alternating current is converted into a high voltage alternating current by the amplifying circuit and the step up circuit, and the high voltage alternating current makes the emitting electrode generate a high voltage electrical field, and the receiving electrode senses the high voltage electrical field and converts the high voltage electrical field into a high voltage alternating current, and after the high voltage alternating current flows through the step down circuit and the rectification circuit, a direct current used for the apparatus to be charged is obtained.

The wireless charging receiving module further comprises a voltage stabilizing circuit, and the voltage stabilizing circuit is employed to stabilize a direct current transmitted to the apparatus to be charged.

The power generation module, the power storage module and the wireless charging emitting module are located at a shoe, and the wireless charging receiving module is located at the apparatus to be charged. During the time that the human wears the shoe to walk or stays in a motion state, the cutting unit cuts the magnetic induction lines to make the power generation module generate a current to be stored in the power storage module, and is ultimately transmitted to the apparatus to be charged through the wireless charging emitting module.

Moreover, the present invention further provides a wearable device, and the wearable device comprises any of aforesaid wireless charging devices.

In comparison with prior art, the technical solution of the present invention possesses the benefits: the wireless charging device comprises a power generation module, a power storage module, a wireless charging emitting module and a wireless charging receiving module, and the power generation module can generate current, and the power storage module comprises an electrical energy transmission unit and an automatic power storage unit electrically coupled to the electrical energy transmission unit, and the automatic power storage unit is electrically coupled to the power generation module to store the current generated by the power generation module, and the electrical energy transmission unit is electrically coupled to the wireless charging emitting module and provides electrical energy to the wireless charging emitting module, and the wireless charging emitting module transmits the electrical energy to the wireless charging receiving module for charging the apparatus to be charged which the wireless charging receiving module is equipped. Namely, the wireless charging device of the present invention comprises the power generation module, and the power generation module can generate current in a motion state, and the generated current is automatically stored in the automatic power storage unit, and the apparatus to be charged is charged through the electrical energy transmission unit, the wireless charging emitting module and the wireless charging receiving module. Therefore, the human body can make the power generation module be constantly in the motion state, and thus the current can be generated all the time for charging the apparatus to be charged to extend the battery life of the apparatus to be charged.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
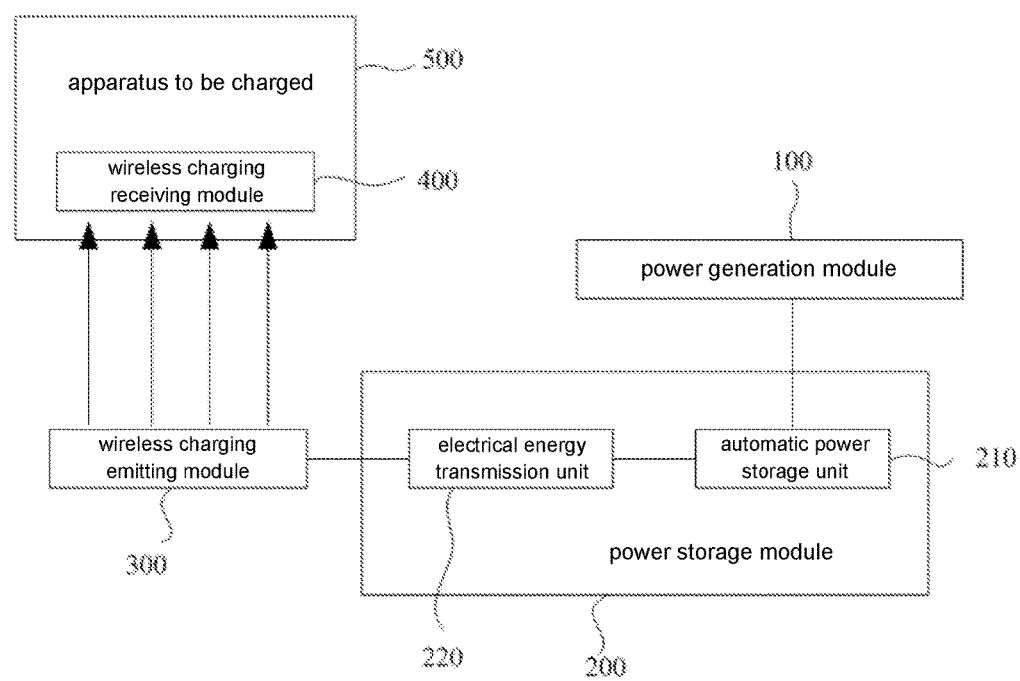
FIG. 1 is a circuit structure diagram of a wireless charging device in the first embodiment of the present invention.

Please refer to FIG. 1. FIG. 1 is a circuit structure diagram of a wireless charging device in the first embodiment of the present invention. In this embodiment (the first embodiment), the wireless charging device comprises a power generation module 100, a power storage module 200, a wireless charging emitting module 300 and a wireless charging receiving module 400, and the power generation module 100 can generate current in a motion state, and the power storage module 200 comprises an electrical energy transmission unit 220 and an automatic power storage unit 210 electrically coupled to the electrical energy transmission unit 220, and the automatic power storage unit 210 is electrically coupled to the power generation module 100 to store the current generated by the power generation module 100, and the electrical energy transmission unit 220 is electrically coupled to the wireless charging emitting module 300 and provides electrical energy to the wireless charging emitting module 300, and the wireless charging emitting module 300 transmits the electrical energy to the wireless charging receiving module 400 for charging the apparatus 500 to be charged which the wireless charging receiving module 400 is equipped.

Figure 2:
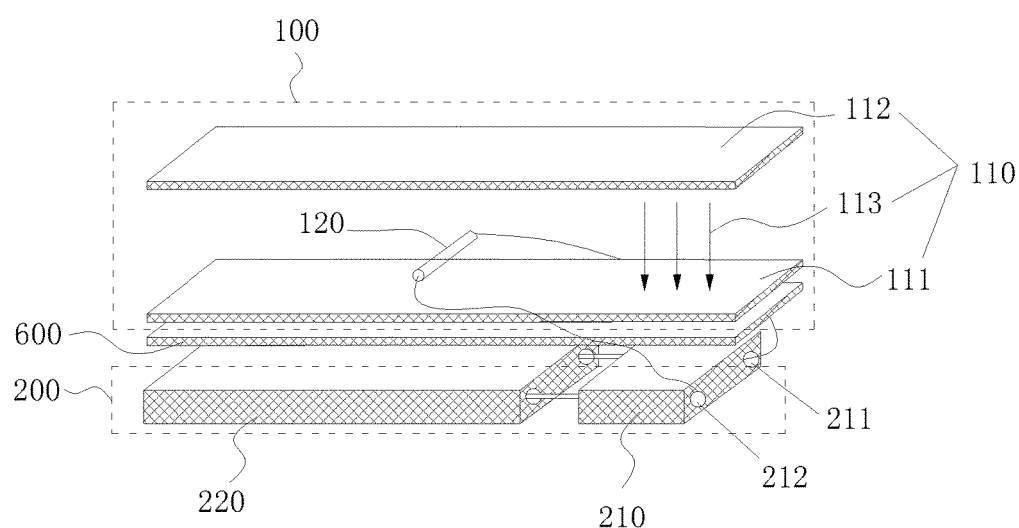
FIG. 2 is a structure diagram of a power generation module and a power storage module of the wireless charging device in the first embodiment of the present invention.

Furthermore, refer to FIG. 2, which is a structure diagram of a power generation module and a power storage module of the wireless charging device in the first embodiment of the present invention. The power generation module 100 comprises a magnetic field generation unit 110 and a cutting unit 120. The magnetic field generation unit 110 comprises a first electrode plate 111, a second electrode plate 112 which are oppositely located and the magnetic induction lines 113 between the first electrode plate 111 and the second electrode plate 112. The first electrode plate 111 can be the N pole or the S pole of the magnetic body, and the second electrode plate 112 correspondingly can be the S pole or the N pole. The magnetic induction line 113 starts from the first electrode plate 111 and ends at the second electrode plate 112. Alternatively, the magnetic induction line 113 starts from the second electrode plate 112 and ends at the first electrode plate 111. In FIG. 2, the magnetic induction line 113 starts from the second electrode plate 112 and ends at the first electrode plate 111, which is merely an illustrative explanation.

The power storage module 200 comprises an electrical energy transmission unit 220 and an automatic power storage unit 210 electrically coupled to the electrical energy transmission unit 220. The automatic power storage unit 210 comprises a first electrode plate 211 and a second electrode plate 212. In this embodiment, the cutting unit 120 is a strip shape conductive line, and preferably to be a metal conductive line. One end of the cutting unit 120 (metal conductive line) is electrically coupled to the first electrode plate 211, and the other end is electrically coupled to the second electrode plate 212. Thus, the automatic power storage unit 210 and the cutting unit 120 (metal conductive line) form a galvanic circle. The cutting unit 120 and the magnetic induction line 113 forms an included angle which is larger than 0° and smaller or equal to 90°, and as the cutting unit 120 is in motion, it can cut the magnetic induction lines 113. Namely, the cutting unit 120 transversely cuts the magnetic induction lines 113 in motion but not passes through the gaps among the magnetic induction lines 113. As the power generation module 100 is in a motion state, the cutting unit 120 cuts the magnetic induction lines 113 to generate a current toward the automatic power storage unit 210, and the automatic power storage unit 210 will store the corresponding electrical energy. The automatic power storage unit 210 can input electrical energy to the electrical energy transmission unit 220 so that the electrical energy transmission unit 220 can provide a direct current to the wireless charging emitting module 300.

The cutting unit 120 (metal conductive line) can move in various directions to cut the magnetic induction lines 113 from different directions. The generated currents of various directions can be stored in the automatic power storage unit 210. As the electrical energy consumption of the electrical energy transmission unit 220 reaches some critical value, the automatic power storage unit 210 inputs electrical energy to the electrical energy transmission unit 220. For instance, as the remaining amount that the electrical energy of the electrical energy transmission unit 220 has been consumed is 10%, the automatic power storage unit 210 will input electrical energy to the electrical energy transmission unit 220. Then, the electrical energy transmission unit 220 can provide electrical energy to the wireless charging emitting module 300. The wireless charging emitting module 300 can emit the electrical energy to the wireless charging receiving module 400 in the apparatus 500 to be charged with electrical field coupling. The wireless charging receiving module 400 provide a direct current to the apparatus to be charged, and thus to extend the battery life of the smart wearable device. If both the automatic power storage unit 210 and the electrical energy transmission unit 220 of the power storage module 200 are in the full state, then the automatic power storage unit 210 stops receiving the electrical energy generated by the power generation module 100.

Figure 3:
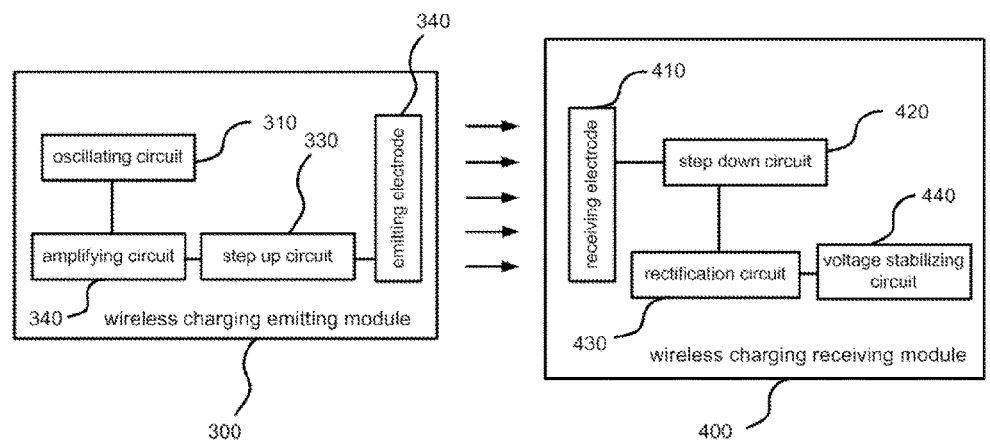
FIG. 3 is a circuit structure diagram of a wireless charging emitting module and a wireless charging receiving module of the wireless charging device in the first embodiment of the present invention.

Furthermore, please refer to FIG. 3. FIG. 3 is a circuit structure diagram of a wireless charging emitting module and a wireless charging receiving module of the wireless charging device in the first embodiment of the present invention. In this embodiment, the wireless charging emitting module 300 comprises an oscillating circuit 310, an amplifying circuit 320 and a step up circuit 330 coupled to the oscillating circuit 310, and an emitting electrode 340 coupled to the step up circuit 330, and the amplifying circuit 320 and the step up circuit 330 are electrically coupled. The wireless charging receiving module 400 comprises a receiving electrode 410, and a step down circuit 420 coupled to the receiving electrode 410 and a rectification circuit 430 coupled to the step down circuit 420. The electrical energy transmission unit 300 is electrically coupled to the electrical energy transmission unit 220. The electrical energy transmission unit 300 inputs a direct current into the wireless charging emitting module 300, and the direct current is converted into an alternating current by the oscillating circuit 310 of the electrical energy transmission unit 300, and the alternating current is converted into a high voltage alternating current by the amplifying circuit 320 and the step up circuit 330, and the high voltage alternating current makes the emitting electrode 340 generate a high voltage electrical field, and emits the high voltage electrical field to the wireless charging receiving module 400, and the receiving electrode 410 of the wireless charging receiving module 400 senses the high voltage electrical field and converts the high voltage electrical field into a high voltage alternating current, and after the high voltage alternating current flows through the step down circuit 420 and the rectification circuit 430, a direct current used for the apparatus to be charged is obtained. The wireless charging receiving module 400 further comprises a voltage stabilizing circuit 440, and the voltage stabilizing circuit 440 allows the wireless charging receiving module 400 to provide a stable direct current for the apparatus 500 to be charged in kinds of environments.

Please refer to FIG. 2. For making no signal interference between the power generation module 100 and the power storage module 200, and fully utilizing the magnetic field of the power generation module 100, a magnetic isolation layer 600 can be arranged between the power generation module 100 and the power storage module 200.

In this embodiment, the wireless charging device comprises a power generation module, a power storage module, a wireless charging emitting module and a wireless charging receiving module, and the power generation module can generate current, and the power storage module comprises an electrical energy transmission unit and an automatic power storage unit electrically coupled to the electrical energy transmission unit, and the automatic power storage unit is electrically coupled to the power generation module to store the current generated by the power generation module, and the electrical energy transmission unit is electrically coupled to the wireless charging emitting module and provides electrical energy to the wireless charging emitting module, and the wireless charging emitting module transmits the electrical energy to the wireless charging receiving module for charging the apparatus to be charged which the wireless charging receiving module is equipped. Namely, the wireless charging device of the present invention comprises the power generation module, and the power generation module can generate current in a motion state, and the generated current is automatically stored in the automatic power storage unit, and the apparatus to be charged is charged through the electrical energy transmission unit, the wireless charging emitting module and the wireless charging receiving module. Therefore, the human body can make the power generation module be constantly in the motion state, and thus the current can be generated all the time for charging the apparatus to be charged to extend the battery life of the apparatus to be charged.

In another implement of this embodiment (the first embodiment), the power generation module 100, the power storage module 200 and the wireless charging emitting module 300 are located inside or outside a shoe, and the wireless charging receiving module 400 is located at the apparatus 500 to be charged. During the time that the human wears the shoe to walk or stays in a motion state, the wireless charging is driven for movement. The cutting unit 120 of the power generation module 100 cuts the magnetic induction lines 113 to generate a current, and the generated current is stored in the power storage module 200 in a form of electrical energy, and is ultimately transmitted to the apparatus 500 to be charged through the wireless charging emitting module 300 and the wireless charging receiving module. Thus, as long as the shoe is wore for walk or movement, the apparatus 500 to be charged can be charged anytime. The kinetic energy is converted into the electrical energy without the charger. The charge is possible without charging source in the outdoor activity. The battery life can be extended simply and conveniently.

Figure 4:
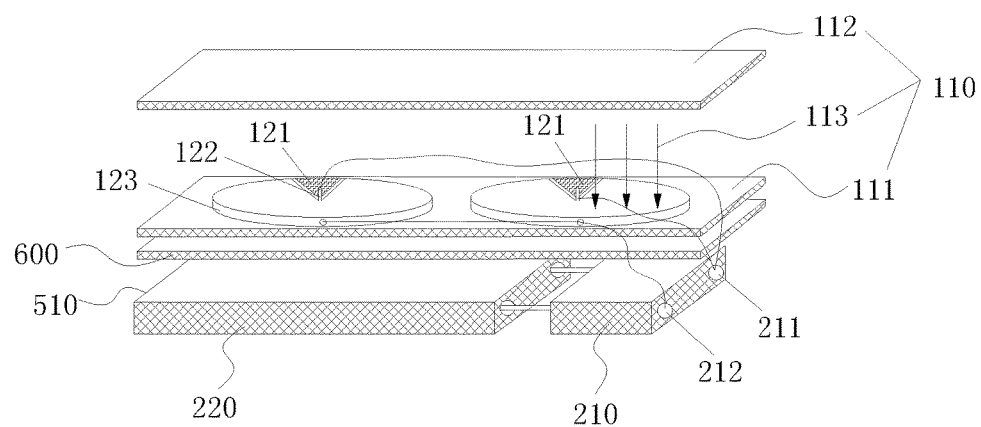
FIG. 4 is a structure diagram of the wireless charging device in the second embodiment of the present invention.
Figure 5:
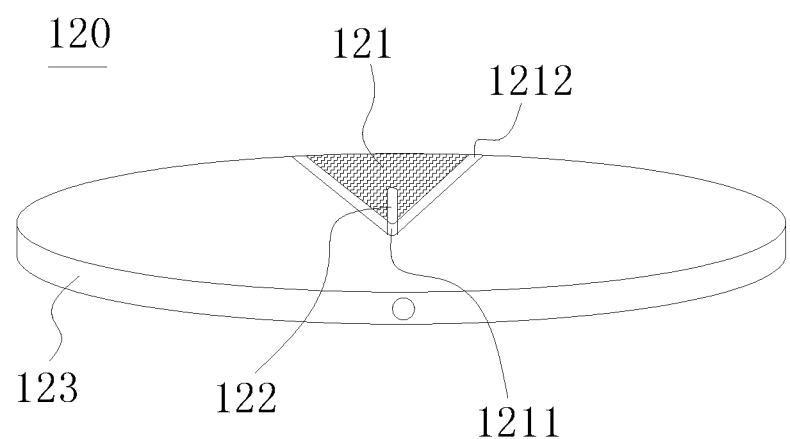
FIG. 5 is a structure diagram of the cutting unit of the wireless charging device in the second embodiment of the present invention.

Please refer to FIG. 4 and FIG. 5. FIG. 4 is a structure diagram of the wireless charging device in the second embodiment of the present invention; FIG. 5 is a structure diagram of the cutting unit of the wireless charging device in the second embodiment of the present invention. The structure of the wireless charging device in this embodiment (the second embodiment) is basically the same as the structure of the wireless charging device in the first embodiment. The difference is that: the structure of the cutting unit 120 is different, namely in this embodiment: the cutting unit 120 comprises at least one cutting guide plate 121, and an inner fixing part 122 and an outer fixing part 123 which are both electrically coupled to the cutting guide plate 121, and the cutting guide plate 121 comprises a fixed end 1211 and a free end 1212, and the fixed end 1211 is rotatably fixed at the inner fixing part 122, and the free end 1212 rotatably contacts with the outer fixing part 123, and the cutting guide plate 121 can rotate around the inner fixing part 122, and the inner fixing part 122 is electrically coupled to the first electrode 211, and the outer fixing part 123 is electrically coupled to the second electrode 212. A cutting plane of the cutting guide plate 121 and the magnetic induction line forms an included angle which is larger than 0° and smaller or equal to 90°. Namely, no matter how the cutting guide plate 121 rotates, it can cut the magnetic induction lines 113.

Specifically, the outer fixing part 123 is a conductive shell of a circular ring, and the inner fixing part 122 appears to be a cylinder. The cylindrical inner fixing part 122 is located at the center axis of the outer fixing part 123 of the circular ring shape. The fixed end 1211 of the cutting guide plate 121 can be a circular ring of which the inner diameter is equal to the outer diameter of the inner fixing part 122, i.e. the fixed end 1211 also can appear to be a circular ring. The fixed end 1211 of the cutting guide plate 121 can be sleeved with the inner fixing part 122, and mutually conducted with the inner fixing part 122. Thus, the cutting guide plate 121 can rotate around the inner fixing part 122 and be conductive at the same time; the free end 1212 of the cutting guide plate 121 electrically contacts with the outer fixing part 123, and the free end 1212 appears to be an circle arc shape. The diameter of the circle arc is approximately equal to the circular ring diameter of the outer fixing part 123 so that the well contact between the free end 1212 and the outer fixing part 123 is possible and the two can be conductive.

The cutting unit 120 is located on the first electrode plate 111 or between the first electrode plate 111 and the second electrode plate 112 for the cutting movement of the cutting unit 120 to the magnetic induction lines 113.

In this embodiment: the cutting unit 120 comprises at least one cutting guide plate 121, and an inner fixing part 122 and an outer fixing part 123 which are both electrically coupled to the cutting guide plate 121, and the cutting guide plate 121 comprises a fixed end 1211 and a free end 1212, and the fixed end 1211 is rotatably fixed at the inner fixing part 122, and the free end 1212 rotatably contacts with the outer fixing part 123, and the cutting guide plate 121 can rotate around the inner fixing part 122, and the inner fixing part 122 is electrically coupled to the first electrode 211, and the outer fixing part 123 is electrically coupled to the second electrode 212. Therefore, as the human drives the wireless charging device to move, the cutting unit 120 is also moved. The cutting guide plate 121 will rotate and cut the magnetic induction lines 113 between the first electrode plate 111 and the second electrode plate 112. The change of magnetic flux in the circle formed with the cutting unit 120 and the automatic power storage unit 210 will be faster, and thus the speed of generating the electrical energy is faster, and the charging speed is quicker, too. It will be more beneficial for extending the battery life.

There can be other implements in this embodiment. For an illustration, the power generation module comprises a plurality of cutting units 120. All the inner fixing parts 122 of the plurality of cutting units 120 are all coupled to the first electrode 211, and all the outer fixing parts 123 of the plurality of cutting units 120 are all coupled to the second electrode 212. Accordingly, the electrical energy generated by the plurality of cutting units 120 can be gathered in the automatic power storage unit 210, i.e. the power generation speed and the power generation amount of the power generation module 100 can be increased.

Moreover, the embodiment of the present invention further provides a wearable device, and the wearable device comprises any of the wireless charging devices in the embodiments.

In the description of the present specification, the reference terms, "one embodiment", "some embodiments", "an illustrative embodiment", "an example", "a specific example", or "some examples" mean that such description combined with the specific features of the described embodiments or examples, structure, material, or characteristic is included in the utility model of at least one embodiment or example. In the present specification, the terms of the above schematic representation do not certainly refer to the same embodiment or example. Meanwhile, the particular features, structures, materials, or characteristics which are described may be combined in a suitable manner in any one or more embodiments or examples.

Above are embodiments of the present invention, which does not limit the scope of the present invention. Any modifications, equivalent replacements or improvements within the spirit and principles of the embodiment described above should be covered by the protected scope of the invention.

What is claimed is:

1. A wireless charging device, wherein the wireless charging device comprises a power generation module, a power storage module, a wireless charging emitting module and a wireless charging receiving module, and the power generation module can generate current in a motion state, and the power storage module comprises an electrical energy transmission unit and an automatic power storage unit electrically coupled to the electrical energy transmission unit, and the automatic power storage unit is employed to store the current generated by the power generation module, and the electrical energy transmission unit is employed to provide electrical energy to the wireless charging emitting module, and the wireless charging emitting module transmits the electrical energy to the wireless charging receiving module;

wherein the power generation module comprises a magnetic field generation unit and a cutting unit, and in a process of a motion of the wireless charging device, the cutting unit cuts the magnetic induction line generated by the magnetic field generation unit to generate the current, and the current is imported to the automatic power storage unit; and wherein the magnetic field generation unit comprises a first electrode plate, a second electrode plate which are oppositely located and the magnetic induction lines between the first electrode plate and the second electrode plate, and the cutting unit is located on the first electrode plate or between the first electrode plate and the second electrode plate, and the cutting unit comprises at least one cutting guide plate, and an inner fixing part and an outer fixing part which are electrically coupled to the cutting guide plate, and the cutting guide plate comprises a fixed end and a free end, and the fixed end is rotatably fixed at the inner fixing part, and the free end rotatably contacts with the outer fixing part, and the cutting guide plate can rotate around the inner fixing part, and the automatic power storage unit comprises a first electrode and a second electrode, and the inner fixing part is electrically coupled to the first electrode, and the outer fixing part is electrically coupled to the second electrode.

2. The wireless charging device according to claim 1, wherein the cutting unit is a metal line electrically coupled to the automatic power storage unit.

3. The wireless charging device according to claim 1, wherein the fixed end of the cutting guide plate appears to be a circular ring, and the inner fixing part appears to be a cylinder, and the fixed end is sleeved with the inner fixing part.

4. The wireless charging device according to claim 3, wherein the wireless charging receiving module further comprises a voltage stabilizing circuit, and the voltage stabilizing circuit is employed to stabilize a direct current transmitted to the apparatus to be charged.

5. The wireless charging device according to claim 1, wherein the power generation module comprises many of the cutting units, and all the inner fixing parts of the cutting units are electrically coupled to the first electrode, and all the outer fixing parts are electrically coupled to the second electrode.

6. The wireless charging device according to claim 5, wherein the wireless charging receiving module further comprises a voltage stabilizing circuit, and the voltage stabilizing circuit is employed to stabilize a direct current transmitted to the apparatus to be charged.

7. The wireless charging device according to claim 1, wherein a cutting plane of the cutting guide plate and the magnetic induction line forms an included angle which is larger than 0° and smaller or equal to 90°.

8. The wireless charging device according to claim 7, wherein the wireless charging emitting module comprises an oscillating circuit, an amplifying circuit and a step up circuit coupled to the oscillating circuit, and an emitting electrode coupled to the step up circuit, and the wireless charging receiving module comprises a receiving electrode, and a step down circuit coupled to the receiving electrode and a rectification circuit coupled to the step down circuit, and the electrical energy transmission unit inputs a direct current into the wireless charging emitting module, and the direct current is converted into an alternating current by the oscillating circuit, and the alternating current is converted into a high voltage alternating current by the amplifying circuit and the step up circuit, and the high voltage alternating current makes the emitting electrode generate a high voltage electrical field, and the receiving electrode senses the high voltage electrical field and converts the high voltage electrical field into a high voltage alternating current, and after the high voltage alternating current flows through the step down circuit and the rectification circuit, a direct current used for the apparatus to be charged is obtained.

9. The wireless charging device according to claim 8, wherein the wireless charging receiving module further comprises a voltage stabilizing circuit, and the voltage stabilizing circuit is employed to stabilize a direct current transmitted to the apparatus to be charged.

10. The wireless charging device according to claim 7, wherein the wireless charging receiving module further comprises a voltage stabilizing circuit, and the voltage stabilizing circuit is employed to stabilize a direct current transmitted to the apparatus to be charged.

11. A wearable device, wherein the wearable device comprises a wireless charging device, and the wireless charging device comprises a power generation module, a power storage module, a wireless charging emitting module and a wireless charging receiving module, and the power generation module can generate current in a motion state, and the power storage module comprises an electrical energy transmission unit and an automatic power storage unit electrically coupled to the electrical energy transmission unit, and the automatic power storage unit is employed to store the current generated by the power generation module, and the electrical energy transmission unit is employed to provide electrical energy to the wireless charging emitting module, and the wireless charging emitting module transmits the electrical energy to the wireless charging receiving module;

wherein the power generation module comprises a magnetic field generation unit and a cutting unit, and in a process of a motion of the wireless charging device, the cutting unit cuts the magnetic induction line generated by the magnetic field generation unit to generate the current, and the current is imported to the automatic power storage unit; and wherein the magnetic field generation unit comprises a first electrode plate, a second electrode plate which are oppositely located and the magnetic induction lines between the first electrode plate and the second electrode plate, and the cutting unit is located on the first electrode plate or between the first electrode plate and the second electrode plate, and the cutting unit comprises at least one cutting guide plate, and an inner fixing part and an outer fixing part which are electrically coupled to the cutting guide plate, and the cutting guide plate comprises a fixed end and a free end, and the fixed end is rotatably fixed at the inner fixing part, and the free end rotatably contacts with the outer fixing part, and the cutting guide plate can rotate around the inner fixing part, and the automatic power storage unit comprises a first electrode and a second electrode, and the inner fixing part is electrically coupled to the first electrode, and the outer fixing part is electrically coupled to the second electrode.

12. The wearable device according to claim 11, wherein the cutting unit is a metal line electrically coupled to the automatic power storage unit.

13. The wearable device according to claim 11, wherein the fixed end of the cutting guide plate appears to be a circular ring, and the inner fixing part appears to be a cylinder, and the fixed end is sleeved with the inner fixing part.

14. The wearable device according to claim 11, wherein the power generation module comprises many of the cutting units, and all the inner fixing parts of the cutting units are electrically coupled to the first electrode, and all the outer fixing parts are electrically coupled to the second electrode.

15. The wearable device according to claim 11, wherein a cutting plane of the cutting guide plate and the magnetic induction line forms an included angle which is larger than 0° and smaller or equal to 90°.

16. The wearable device according to claim 15, wherein the wireless charging emitting module comprises an oscillating circuit, an amplifying circuit and a step up circuit coupled to the oscillating circuit, and an emitting electrode coupled to the step up circuit, and the wireless charging receiving module comprises a receiving electrode, and a step down circuit coupled to the receiving electrode and a rectification circuit coupled to the step down circuit, and the electrical energy transmission unit inputs a direct current into the wireless charging emitting module, and the direct current is converted into an alternating current by the oscillating circuit, and the alternating current is converted into a high voltage alternating current by the amplifying circuit and the step up circuit, and the high voltage alternating current makes the emitting electrode generate a high voltage electrical field, and the receiving electrode senses the high voltage electrical field and converts the high voltage electrical field into a high voltage alternating current, and after the high voltage alternating current flows through the step down circuit and the rectification circuit, a direct current used for the apparatus to be charged is obtained.

* * * * *